Jan. 25, 1938.                O. A. HAREL                2,106,349
             HAND BRAKE FOR RAILWAY CARS AND THE LIKE
                  Filed July 28, 1934        3 Sheets-Sheet 1
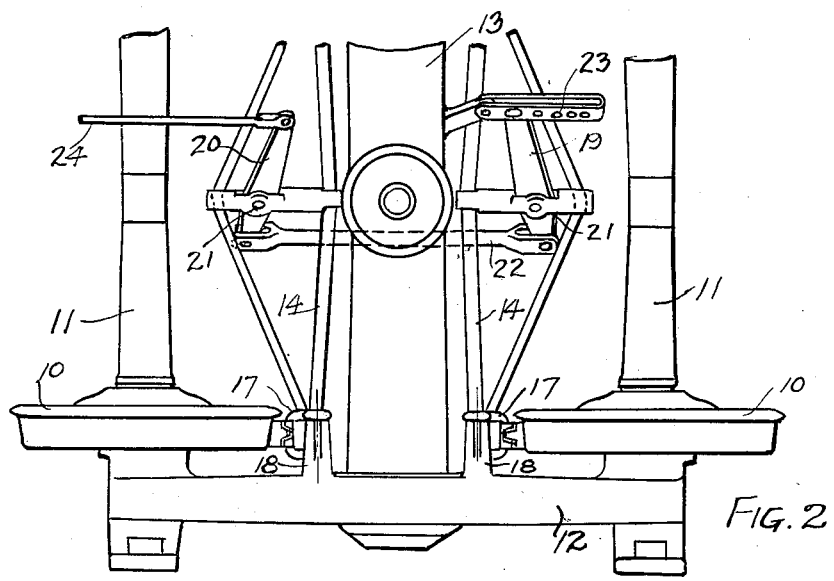
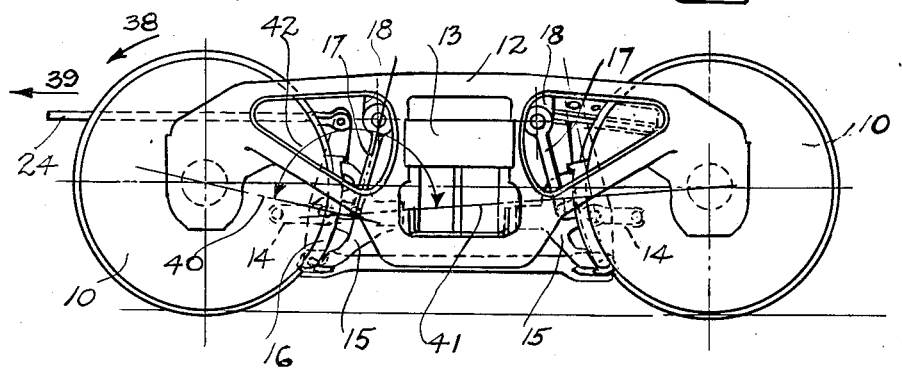
INVENTOR.
OLIVIER A. HAREL
BY George B. Dorey
ATTORNEY.

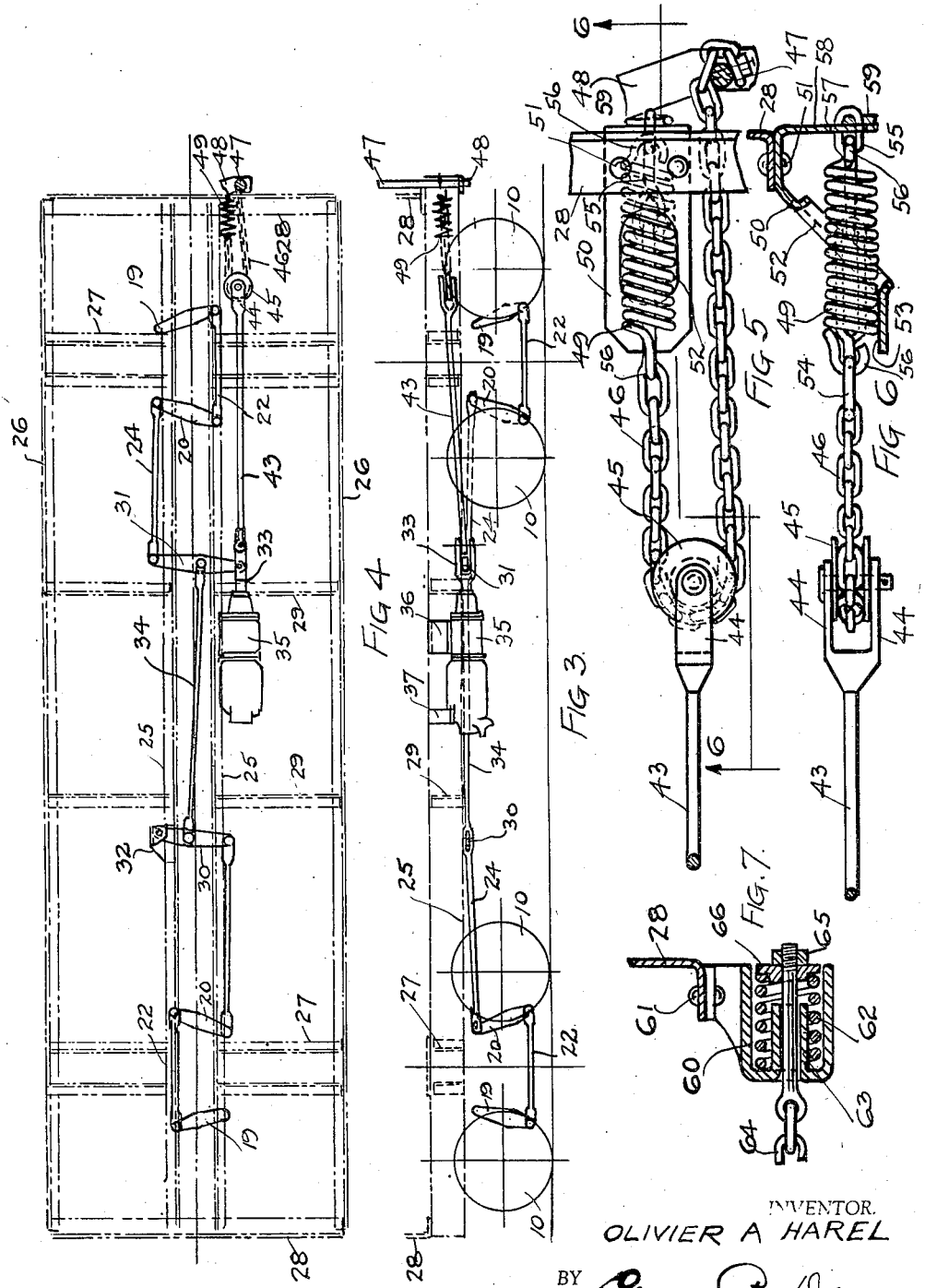

Jan. 25, 1938.   O. A. HAREL   2,106,349
HAND BRAKE FOR RAILWAY CARS AND THE LIKE
Filed July 28, 1934   3 Sheets-Sheet 3
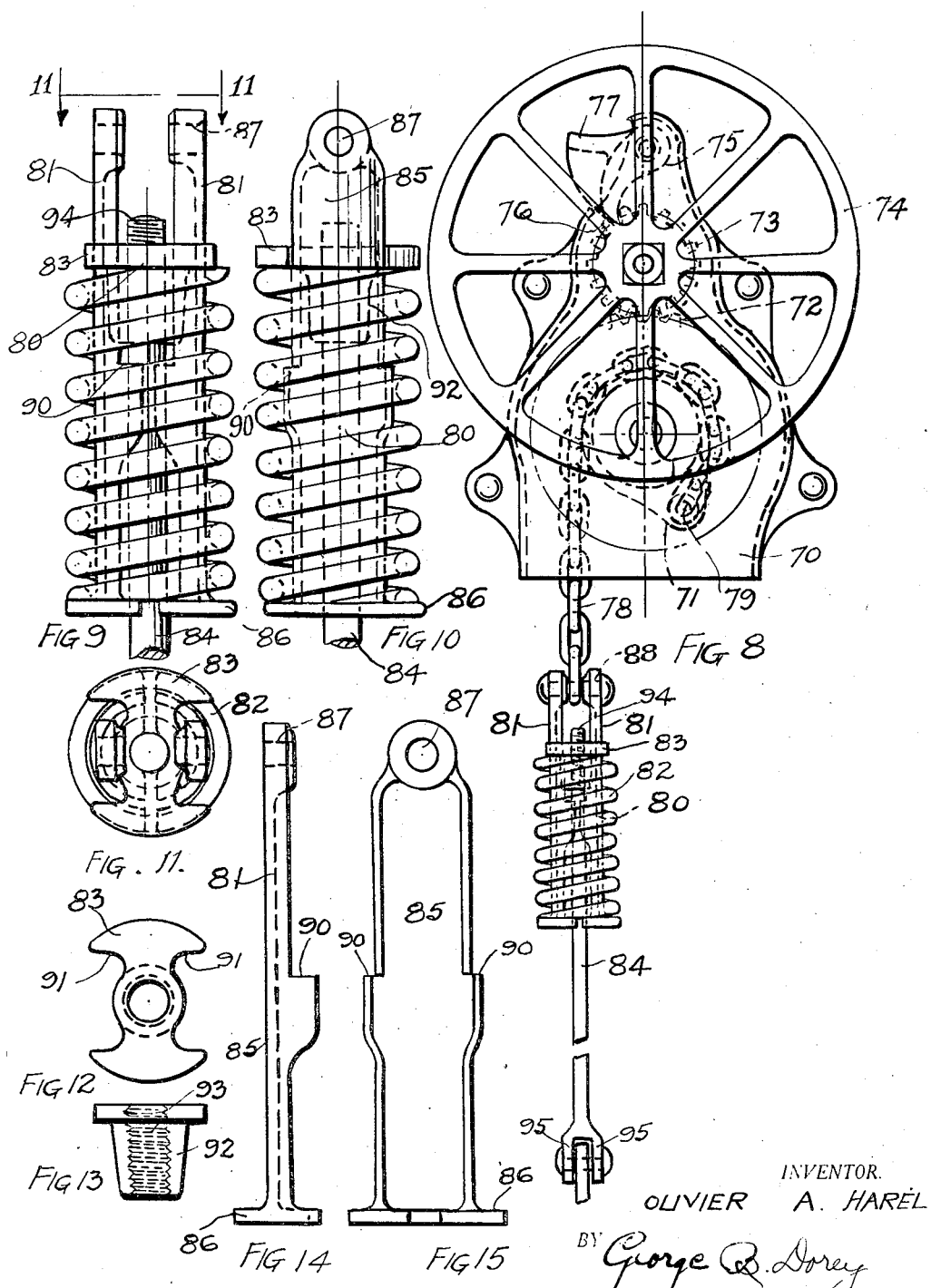
INVENTOR.
OLIVIER A. HAREL
BY George B. Dorey
ATTORNEY.

Patented Jan. 25, 1938

2,106,349

UNITED STATES PATENT OFFICE 2,106,349

HAND BRAKE FOR RAILWAY CARS AND THE LIKE

Olivier A. Harel, Montreal, Quebec, Canada, assignor to George B. Dorey, Montreal, Quebec, Canada Application July 28, 1934, Serial No. 737,354

5 Claims. (Cl. 188—217)

My invention relates to improvements in hand brakes for railway cars and the like.

An object of the invention is to provide a hand brake arrangement which will permit the gradual application of braking force to the wheels in such a manner as to obviate locking of the brake shoes and consequent wheel skidding.

Another object of my invention is to provide resilience in the braking system whereby the car brake shoes will be positively maintained in braking relation with the wheels and be thereby secured against accidental release, due to jolting of the car or disturbance in the relative position of the car body and wheels.

Another further object of my invention is to provide such a degree of resilience in the braking system as to prevent shocks caused by chattering of brakes from being communicated directly to the brakemen during the operation of the brakes.

A still further object of my invention is to render the brake chain self adjustable in length and prevent fouling and kinking of the chain links.

A more specific object of the invention is to increase the efficiency of hand braking by taking advantage of a spring's tendency to oscillate under a suddenly applied load.

My invention further resides in certain details of construction such as will be fully pointed out hereinafter.

For further comprehension of my invention, reference may be had to the accompanying drawings, wherein:

Fig. 1 is a longitudinal, vertical, side elevational view of one of the trucks of a freight car showing the usual brake shoes and related attachments.

Fig. 2 is a top plan view showing slightly more than one half the width of the car truck.

Fig. 3 is a longitudinal, vertical elevational view of a car illustrating the car structure in conventional dash and dotted lines and showing the wheels and braking system in full lines.

Fig. 4 is a top plan view of the structure illustrated in Fig. 3.

Fig. 5 is a view on an enlarged scale illustrating, in detail, as much of Fig. 4 as necessary to show my invention.

Fig. 6 is a vertical, longitudinal, elevational sectional view taken on a line 6—6 of Fig. 5.

Fig. 7 is a vertical, longitudinal, elevational, sectional view of an alternate construction wherein a compression spring is substituted for the tension spring illustrated in Fig. 6.

Fig. 8 is a vertical elevational view of a so-called vertically arranged hand brake wherein my improved spring device is incorporated as one of the end links of the winding chain.

Fig. 9 is a view, on an enlarged scale, of the spring structure shown in Fig. 8.

Fig. 10 is a side elevational view of the structure shown in Fig. 9, as viewed from right to left.

Fig. 11 is a top plan view of Fig. 9, as viewed on a line 11—11 of Fig. 9.

Fig. 12 is a plan view of the threaded head which normally engages with one end of the spring.

Fig. 13 is a vertical elevational view of the head shown in Fig. 12.

Fig. 14 is a view of one of the yoke members as seen in Fig. 9.

Fig. 15 is a side elevational view of the yoke member shown in Fig. 14.

Referring now to the drawings, and particularly to Figures 1 and 2 in which one of the trucks is illustrated: In said drawings, 10 indicates the wheels, 11 the axles, 12 the truck side frame, 13 the truck bolster, 14 the brake beams, 15 the brake heads and 16 the brake shoes. The brake shoes and heads are rigidly mounted on each end of the brake beams and said beams are pendently supported by means of brake hangers 17 from brackets 18, the latter being formed integrally with the side frames. There are two brake beams for each truck and these are arranged in opposed relation as indicated in Fig. 1. The opposed beams are operated in unison by substantially vertically disposed levers 19 and 20, said levers being pivotally united with the brake beams as indicated at 21. The lower ends of said levers 19 and 20 are spaced apart and united with a connecting rod 22. The lever 19, at its upper end is anchored to the truck bolster by means of an adjustable connection 23 and the upper end of the companion lever 20 receives one end of a connecting rod 24, the latter forming the link between the truck brakes and the brake applying means carried by the car body.

Referring now to Figs. 3 and 4 wherein the car body frame members are conventionally shown in dash and dotted lines, 25 being the longitudinal center sills, 26 the side sills, 27 the body bolsters, 28 the car end sills and 29 indicating the crossbeam members of the car, it will be seen that the connecting rods 24 of the respective trucks make connection with horizontally disposed levers indicated at 30 and 31 respectively. The said levers 30 and 31 extend transversely of the car away from the connecting rods 24 and respectively connect with a stationary bracket 32 and an air brake cylinder push rod 33. A connecting top rod 34 extends between the respective levers 30 and 31 and causes them to function in unison.

The brake cylinder 35 is rigidly mounted with respect to the car body by means of bracket means 36 and 37 and the brake setting operation through the medium of the air brake system is effected by admitting compressed air into the cylinder which acts upon a piston which in turn forces the pushrod 33 outwardly. Outward movement of the pushrod causes the lever 31 to rotate about its pivotal connection with top rod 34 and at the same time exerts a pull on the latter which has the effect of causing the said levers 30 and 31 to rotate so as to draw the top rods 24 of the opposite trucks towards each other. The pressure of the air in the cylinder is normally slowly built up and by reason of the expanding nature of the air, the application of the brakes is gradual and the shoes pressed smoothly into engagement with the wheels. Furthermore the brake shoes are maintained in braking engagement by the steady resilient pressure of the air and such variations in the brake system as are brought about by loose pins are readily compensated for.

The hand brake system or that part of the braking arrangement which is dependent upon the manual operation of a take up device has heretofore largely depended on some form of winding device having associated therewith a ratchet and pawl mechanism to prevent unwinding. Such devices, by reason of lacking the resilience and flexibility of compressed air power, force the shoes into tight wedging engagement with the wheels too suddenly thereby resulting in freezing of the brake shoes to the wheels, skidding of the wheels, kinking and fouling of the brake chain and moreover are often unsafe to operate due to irregular and jerky movements of the brake shoes.

The major cause which brings about the disadvantages above enumerated is due to lack of flexibility between the hand brake and brake shoes and I have found that a suitable spring properly located in the system corrects these defects.

The further necessity for flexibility in the hand brake system may best be understood by reference to Fig. 1 wherein it will be noted that the center of the brake shoes is located a limited distance below the center of the wheels, this distance in a standard freight car being 3½ inches. Assuming that a car is in motion with the wheels turning in the direction indicated by arrow 38, and assuming that a sudden pull be exerted on the pull rod 24, in the direction of travel of the car, as indicated by arrow 39, the opposed brake shoes are forced apart and there is created a strong frictional binding action between the shoes and wheels moving in the direction of movement of the arrow 38; said frictional action draws the brakebeam and its shoes upwardly and in view of the wide angle between lines 40 and 41 it will be appreciated that the upward thrust is of considerable magnitude. The upward thrust of the beams and shoes is counteracted by the brakebeam hangers 17 but after a period of service the pivots and bearings associated with the hangers become worn thereby permitting the shoes to move upwardly still further and increasing the angle 42. Under these circumstances it is not uncommon for the brakes to be apparently so tightly set as to lock the wheels against movement in one direction and yet the brake chain and connections will have a slack of ½ inch or more so that a slight push on the car in the reverse direction will immediately cause the brakebeam to drop and release the brakes.

My invention contemplates the use of a spring in the hand brake connections which will approximate in capacity or slightly exceed the maximum strain which it is desired to impart to said connections and which will have a deflection sufficient to take care of all irregularities which may be anticipated in service.

In the embodiment of my invention shown in Figs. 3 to 6 inclusive, a connection 43 is shown as leading from the pushrod towards the end of the car, said connection 43 at its outer end is formed with a pair of jaws 44—44 between which a sheave wheel 45 is mounted. Extending around the sheave wheel 45 is a chain 46, which, at one end, has a movable or live portion secured to a winding brake shaft 47, the latter having at its lower end a bearing portion rotatably mounted in a bracket 48. The opposite, or dead end of the chain, instead of being rigidly connected to the car structure makes connection with a tension spring 49, the latter being secured to a bracket 50 which in turn is riveted to the end sill of the car as indicated at 51. The bracket 50 is preferably formed of a plate pressed to shape as indicated and is formed with an elongated opening 52 through which the spring extends. The lower portion of the bracket is formed with a shelf portion 53 which forms a support for the spring. The travel of the spring is limited by reason of elongated slotted links 54 and 55 which extend within the spring and are adapted to take the strain in the event of spring weakness or breakages, said links 54 and 55 respectively engage with looped ends 56 at the respective ends of the spring. Link 55 is extended through a slot 57 formed in the depending portion 58 of the bracket 50 and the protruding end of the link is locked in place by a retaining ring 59.

In the modification shown in Fig. 7, a rigid hollow bracket 60 is secured to the end sill by rivets 61. The bracket on its inner side is of elongated cylindrical formation within which is mounted a compression spring 62. Preferably formed integrally with the housing is an elongated cylindrical portion 63 which lies within the spring and is of lesser length than the free height of the spring. Extending through the said portion 63 is an eyebolt which connects at one end with the chain 64 and at the opposite end is threaded to receive a nut 65 whereby a cap 66 is maintained in place to form a seat for the movable end of the spring.

When the spring is fully compressed the bearing cap 66 contacts with the end of the column portion 63 and thus relieves the spring from excessive overloading.

Referring now to the modification shown in Figs. 8 to 15 inclusive my invention is shown in connection with a vertically disposed operating wheel type of hand brake. In said drawings, 70 indicates a housing adapted to be riveted or otherwise secured to the car structure, said housing is of hollow formation and pivotally mounted within the same is a winding sheave 71 with which a gear wheel 72 is nonrotatably associated. Cooperating with the gear wheel is a pinion 73 which is likewise pivotally mounted with respect to the housing and nonrotatably associated with the said pinion is an operating wheel 74, the latter being disposed outwardly of the housing and constituting the brake operating means. A pivoted pawl 75 co-operates with the teeth 76 to maintain the brake against unwinding movement, said pawl being provided with an extension 77 for convenience in operation and providing the necessary weight to assure adequate downward movement. A brake chain 78 winds around the sheave and is secured to the latter as indicated at 79, said chain at its opposite end connects with a spring structure 80.

The spring structure 80 includes a pair of yoke members 81—81; a spring 82; a spring head 83; and a threaded rod 84, said rod co-operating with head 83 to provide an adjustable connection with the brakes. The yoke members 81 are each formed with an elongated body portion 85, preferably formed of semi-cylindrical shape and at the lower portion there is an outwardly extending shouldered portion 86 which seats beneath the spring 82. The respective members 81 extend upwardly beyond the spring and are there formed with an opening 87 through which a pin or rivet 88 extends for connection with the chain 78. Each of the yoke members is provided with laterally projecting stop lugs 90, said lugs being adapted to engage with the spring head 83 for limiting movement of the parts.

The spring head 83 is formed with cutaway portions 91 to straddle the body portions of the yoke members 81, said head is provided with a thimble like portion 92 which is threaded at 93 to receive the threaded end 94 of the rod 84. The member 83 maintains the upper part of the pair of yoke members in spaced relation and the rod 84 performs a similar function at the lower portion of the yoke members.

The lower end of the rod 84 is provided with a pair of jaws 95—95 for cooperating with adjacent parts of the brake rigging.

The spring arrangement shown in the vertically arranged type of brake is of a particularly simple construction, and the disposition of the spring means in close proximity to the brake operating wheel makes it of importance in preventing shocks, such as caused by chattering of brakes, from being communicated to the brakemen. This type of construction also dispenses with the carrying means for the spring and renders the weight of the spring device available to assist in releasing the brake take up device and unwinding the chain.

In addition to the advantages heretofore mentioned, my improvements enable the brakemen to employ their braking efforts to greater advantage than has heretofore been possible with the rigid type of brake. With a spring device inserted in the brake system, the brakeman applies his efforts against a yielding resistance and by a sudden application of the loading force the spring is caused to deflect a greater extent than would be the case should a force of the same magnitude be slowly applied. Inasmuch as the springs preferably used in connection with my invention are of the type in which deflection and resistance increase proportionately, it will be appreciated that increased deflection will be accompanied by a proportionate increase in resistance.

It is evident that the increased spring resistance, brought about by the application of load applied in the form of a quick pull or jerk, can only be temporary because as soon as the kinetic force which has acted upon the spring is spent, the spring recoil becomes effective and the spring would normally return to normal if it were not for the fact that during the winding of the brake the pawl and ratchet mechanism prevent unwinding movement, thereby retaining the potential energy stored in the spring and making it available to exert a steady pressure on the brakes.

It is oftentimes difficult with the rigid type of brake gear to obtain proper registration of the pawl and ratchet teeth of hand brakes to obtain the requisite tension in the brake system, it often developing that a certain tooth of the brake ratchet will lock the winding arrangement at a point where the brakes are not effective and to wind the brake further so as to bring the next succeeding tooth of the ratchet into engagement with the pawl may require the exertion of power far beyond the scope of a manually operated device. Under such circumstances my improved brake is particularly desirable because the resilient connection permits the locking pawl to engage with successive teeth of the ratchet and maintain proper tension without straining the hand brake take up device.

The use of a resilient element in the chain connection provides extra travel and spreads the brake chain winding operation over a longer interval of time thus providing the necessary time element for the chain to smooth out any irregularities in the links, such as occur in the form of kinks and lead to the chain fouling as it is wound around the brake sheave or winding shaft.

My invention is simple to manufacture, is of light weight, does not contain material subject to wear, is comparatively inexpensive, may be applied to existing cars without any change in the airbrake system and furthermore does not interfere with the travel of the airbrake parts inasmuch as my spring is mounted independently of and beyond the airbrakes.

While I have shown certain preferred embodiments of my invention, it is to be understood that I do not limit myself to the same but contemplate all modifications which come within the scope of the appended claims.

What I claim is:

1. In a railway car brake including brake elements and a manually operated take up device for operating said brake elements; connecting means between the brake elements and the take up device, said connecting means including a pulley block and a flexible connection looped around said pulley block and having its opposite ends respectively connected to the car structure and with the take up device; a bracket rigidly mounted on the car structure and a spring interposed between the dead end of the chain and the car structure, said spring being directly supported by the bracket.

2. In a railway car having a brake and a manually operated brake applying means; a connection between said brake and brake applying means, said connection including a substantially vertically disposed connection movable downwardly to release the manually operated brake applying means, said vertical connection including therein a resilient extensible device so disposed as to form a link adapted to assume a normal position of its own weight with the weight thereof available to assist in returning the vertical connection to brake release position.

3. In a railway car brake mechanism, means for maintaining tensional strain in the brake rod connections and including: a shouldered brake rod; brake connecting jaws slidably associated with said rod, said jaws also having shouldered portions; and a coil spring encircling the said rod and interposed between the shoulders of the jaws and rod respectively, said jaws projecting beyond the shouldered part of the rod and formed with flat portions lying on each side of the shouldered portion of the rod, said jaws beyond the rod being provided with transversely alined openings adapted to receive a pin for connecting with adjacent connection means, said jaws and rod being disposed in overlapping relation throughout the length of the spring.

4. As an article of manufacture, a brake rod assembly for maintaining a stabilizing tensional force in the brake system of a railway car, said assembly including a rod having an abutment; a pair of independently mounted jaws slidably associated with said rod, said members of the pair being disposed on the respective sides of the rod and each formed with an integral shoulder; a coil spring interposed between the abutments of the rod and jaws respectively, said jaws being extended beyond the rod through the spring and spaced apart by the rod.

5. In a railway car including brake elements and a manually operated device adapted to act as a take up for moving the brake elements: connecting means between the brake elements and the take up device, said connecting means including a device having at one end a substantially dead anchorage with the car structure and having at the opposite end a live portion movable relatively to the anchorage end and adapted to be acted upon by the take up device, said device intermediate the live and dead portions having a connection with the brake elements; and resilient means carried by the car structure adapted to provide a yielding connection between the car structure and the dead portion of the device.

OLIVIER A. HAREL.